US009031152B2

(12) United States Patent
Miyata

(10) Patent No.: US 9,031,152 B2
(45) Date of Patent: May 12, 2015

(54) COMMUNICATION APPARATUS AND COMMUNICATION METHOD

(75) Inventor: Takeo Miyata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/995,108

(22) PCT Filed: Dec. 9, 2011

(86) PCT No.: PCT/JP2011/078550
§ 371 (c)(1),
(2), (4) Date: Jun. 17, 2013

(87) PCT Pub. No.: WO2012/086436
PCT Pub. Date: Jun. 28, 2012

(65) Prior Publication Data
US 2013/0279623 A1 Oct. 24, 2013

(30) Foreign Application Priority Data
Dec. 22, 2010 (JP) ................. 2010-286411

(51) Int. Cl.
H04B 15/00 (2006.01)
H04L 1/00 (2006.01)
H04L 27/00 (2006.01)

(52) U.S. Cl.
CPC ............. *H04L 1/0001* (2013.01); *H04L 1/0003* (2013.01); *H04L 1/0016* (2013.01); *H04L 27/0008* (2013.01)

(58) Field of Classification Search
CPC ... H04L 1/0026; H04L 1/0003; H04L 5/0023; H04L 1/0009; H04L 27/0008; H04L 1/0025; H04L 1/0618; H04B 7/0669; H04B 7/0678; H04B 7/0689
USPC .......... 375/285, 259, 260, 295, 316, 296, 317
See application file for complete search history.

(56) References Cited

U.S. PATENT DOCUMENTS

2007/0066242 A1* 3/2007 Yi et al. ................. 455/69
2007/0153833 A1* 7/2007 Chang et al. ............ 370/477

(Continued)

FOREIGN PATENT DOCUMENTS

| CN | 1946231 A | 4/2007 |
|---|---|---|
| CN | 101207461 A | 6/2008 |

(Continued)

OTHER PUBLICATIONS

International Search Report dated Jan. 31, 2012, issued for International Application No. PCT/JP2011/078550.

(Continued)

*Primary Examiner* — Kenneth Lam
(74) *Attorney, Agent, or Firm* — Procopio, Cory, Hargreaves & Savitch LLP

(57) ABSTRACT

A communication level table storage unit stores a communication level table that defines correspondence between a communication level at least defined by MCS (modulation scheme and coding rate) and a range of required CINR at the communication level. A communication quality management unit obtains CINR of a received signal at another communication apparatus which is a communication partner. A setting unit refers to the communication level table, and when a difference between a representative value of a range of required CINR at a current communication level and a representative value of a range of required CINR of CINR at a communication level which is one level higher is more than or equal to a threshold value, sets a communication level such that the obtained CINR of the received signal is included in the range of required CINR.

12 Claims, 11 Drawing Sheets

(56) References Cited

U.S. PATENT DOCUMENTS

| | | |
|---|---|---|
| 2008/0159192 A1* | 7/2008 | Lee et al. ............... 370/310 |
| 2009/0010211 A1* | 1/2009 | Sumasu et al. ......... 370/329 |
| 2009/0060094 A1* | 3/2009 | Jung et al. .............. 375/340 |
| 2009/0141673 A1* | 6/2009 | Hwang et al. .......... 370/328 |
| 2009/0161613 A1* | 6/2009 | Kent et al. .............. 370/329 |
| 2009/0247171 A1 | 10/2009 | Suga |
| 2009/0257357 A1* | 10/2009 | Marsh .................... 370/252 |
| 2010/0208675 A1* | 8/2010 | Song et al. ............. 370/329 |
| 2010/0220675 A1* | 9/2010 | Chun et al. ............ 370/329 |
| 2011/0150113 A1* | 6/2011 | Oyman et al. ......... 375/260 |
| 2011/0246847 A1* | 10/2011 | Jin et al. ................. 714/749 |

FOREIGN PATENT DOCUMENTS

| | | |
|---|---|---|
| JP | 2007-324651 A | 12/2007 |
| JP | 2009-130659 A | 6/2009 |
| JP | 2009-246798 A | 10/2009 |
| JP | 2010-219949 A | 9/2010 |

OTHER PUBLICATIONS

Office action dated Mar. 13, 2015 issued in counterpart Chinese application No. 201180060286.7.

* cited by examiner

FIG.2

| COMMUNICATION LEVEL | MIMO | MCS | REQUIRED CINR |
|---|---|---|---|
| 1 | MATRIX-A | QPSK 1/2 | CINR≤x1 |
| 2 | MATRIX-A | QPSK 3/4 | x1<CINR≤x2 |
| 3 | MATRIX-A | 16QAM 1/2 | x2<CINR≤x3 |
| 4 | MATRIX-A | 16QAM 3/4 | x3<CINR≤x4 |
| 5 | MATRIX-A | 64QAM 2/3 | x4<CINR≤x5 |
| 6 | MATRIX-A | 64QAM 3/4 | x5<CINR≤x6 |
| 7 | MATRIX-A | 64QAM 5/6 | x6<CINR≤x7 |
| 8 | MATRIX-B | 64QAM 1/2 | x7<CINR≤x8 |
| 9 | MATRIX-B | 64QAM 2/3 | x8<CINR≤x9 |
| 10 | MATRIX-B | 64QAM 3/4 | x9<CINR≤x10 |
| 11 | MATRIX-B | 64QAM 5/6 | x10<CINR |

| COMMUNICATION LEVEL | MCS | REQUIRED CINR |
|---|---|---|
| 1 | QPSK 1/2 | CINR ≤ y1 |
| 2 | 16QAM 1/2 | y1 < CINR ≤ y2 |
| 3 | 16QAM 3/4 | y2 ≤ CINR < y3 |
| 4 | 64QAM 2/3 | y3 ≤ CINR < y4 |
| 5 | 64QAM 5/6 | y4 ≤ CINR |

COMMUNICATION APPARATUS AND COMMUNICATION METHOD

TECHNICAL FIELD

The present invention relates to a communication apparatus and a communication method.

BACKGROUND ART

A system aiming at improving frequency use efficiency, such as WiMAX (Worldwide Interoperability for Microwave Access), LTE (Long Term Evolution) or XGP (eXtended Global Platform), employs adaptive modulation changing control in which an optimal modulation scheme is used according to circumstances.

In adaptive modulation changing control, a change of modulation scheme is generally determined by means of error rate. Specifically, if no error occurs under a modulation scheme currently used, a change is made to a modulation scheme at the next upper level (see PTD 1 (Japanese Patent Laying-Open No. 2010-219949)).

CITATION LIST

Patent Document

PTD 1: Japanese Patent Laying-Open No. 2010-219949

SUMMARY OF INVENTION

Technical Problem

However, MCS (Modulation and Coding Scheme) used for adaptive modulation differs among systems.

In a certain system, a receiving condition under a certain modulation scheme A is such that the error rate can be maintained at 0%, while the error rate may be 100% under a modulation scheme B which is one level higher. Therefore, if a change is made from modulation scheme A to modulation scheme B based on the error rate (0%), throughput will be reduced.

It is therefore an object of the present invention to provide a communication apparatus and a communication method that can make a change of modulation scheme without reducing throughput.

Solution to Problem

In order to achieve the above-described object, a communication apparatus of the present invention includes a storage unit configured to store information that defines correspondence of a communication level at least defined by a modulation scheme and a coding rate with a range of a required carrier to interference and noise ratio at the communication level, a communication quality management unit configured to obtain a carrier to interference and noise ratio of a received signal at another communication apparatus which is a communication partner, a setting unit configured to refer to the information that defines the correspondence in the storage unit, and when a difference between a representative value of a range of a required carrier to interference and noise ratio at a current communication level and a representative value of a range of a required carrier to interference and noise ratio at a carrier to interference and noise ratio at a communication level which is one level higher is more than or equal to a threshold value, set a communication level such that the obtained carrier to interference and noise ratio of the received signal is included in the range of the required carrier to interference and noise ratio, and a transmission unit configured to transmit a signal in accordance with the set communication level.

Advantageous Effects of Invention

According to the present invention, the modulation scheme can be changed without reducing throughput.

BRIEF DESCRIPTION OF DRAWINGS

FIG. 2 represents an example of a communication level table.

DESCRIPTION OF EMBODIMENTS

Embodiments of the present invention will be described below with reference to the drawings.

First Embodiment

Configuration of Wireless Base Station

Figure 1:
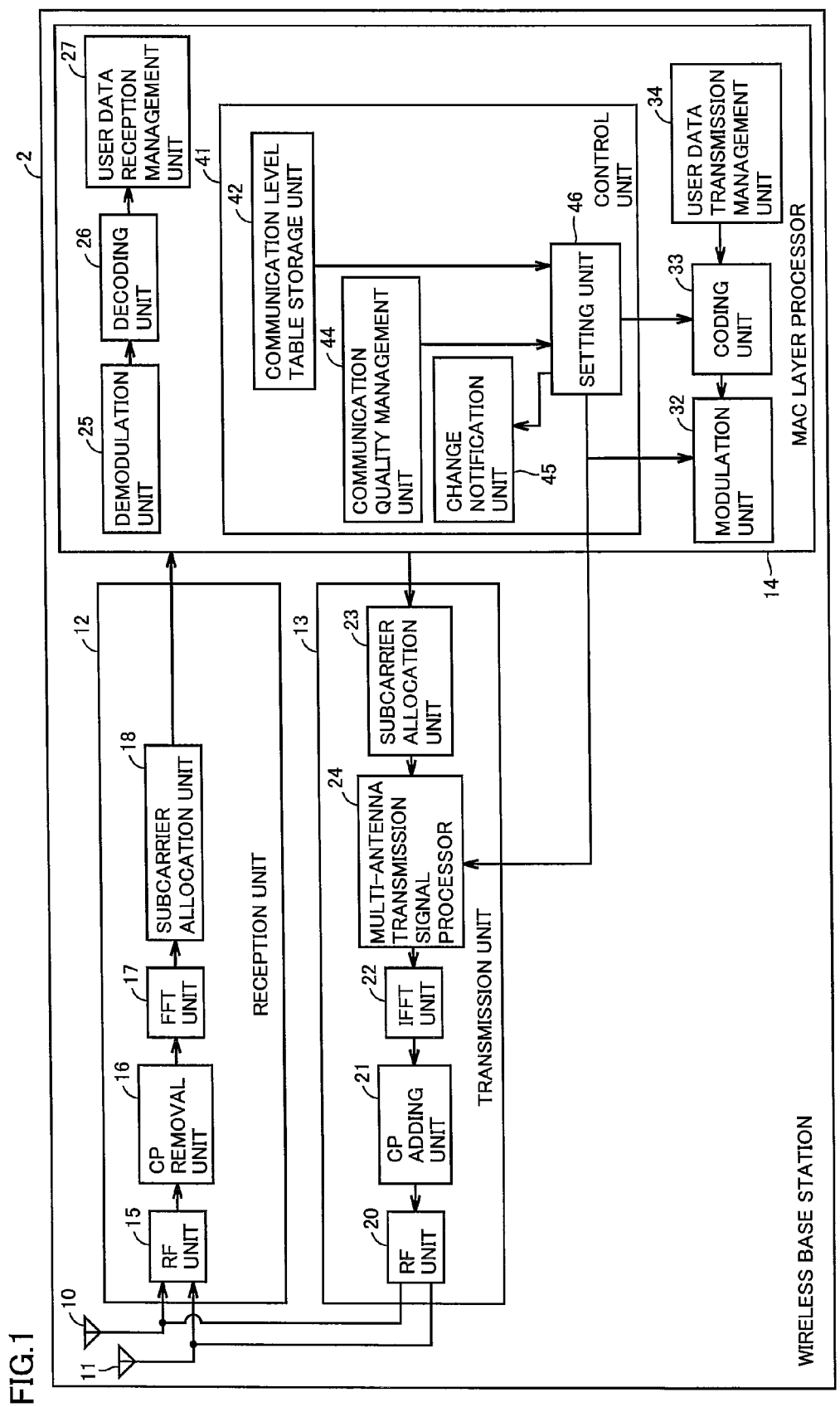
FIG. 1 represents a configuration of a wireless base station according to a first embodiment.

FIG. 1 represents a configuration of a wireless base station according to a first embodiment.

Referring to FIG. 1, this wireless base station 2 is a base station that operates under the WiMAX communication scheme and includes a first antenna 10, a second antenna 11, a transmission unit 13, a reception unit 12, and an MAC (Media Access Control) layer processor 14.

Transmission unit 13 includes a multi-antenna transmission signal processor 24, a subcarrier allocation unit 23, an IFFT (Inverse First Fourier Transform) unit 22, a CP (Cyclic Prefix) adding unit 21, and an RF (Radio Frequency) unit 20.

Subcarrier allocation unit 23 allocates a subcarrier based on, for example, PUSC (Partial Usage of Subchannels).

Multi-antenna transmission signal processor 24 transmits a signal under a MIMO communication scheme which is a wireless communication scheme in which a plurality of antennas are combined to broaden the band of data transmission/reception. When the MIMO (Multiple Input Multiple Output) communication scheme set for a downlink signal (hereinafter referred to as a DL-MIMO (DownLink-MIMO) communication scheme) is MATRIX-A defined by the WiMAX forum, multi-antenna transmission signal processor 24 subjects a data stream to time-space coding (e.g., Alamouti coding). When the DL-MIMO communication scheme is MATRIX-B defined by the WiMAX forum, multi-antenna transmission signal processor 24 subjects a plurality of data streams to spatial multiplexing.

IFFT unit 22 converts a plurality of subcarrier signals (signals in the frequency range) output from multi-antenna transmission signal processor 24 into a signal of the time region (OFDMA (Orthogonal Frequency Division Multiple Access) symbol) by IFFT.

CP adding unit 21 adds a signal equivalent to the tail of the OFDMA symbol to the head of the OFDMA symbol as the CP.

RF unit 20 includes an up converter for up-converting a radio frequency band, a power amplification circuit amplifying an up-converted signal, and a bandpass filter for passing only the signal component of a desired band among the amplified signals for output to first antenna 10 and second antenna 11.

Reception unit 12 includes an RF unit 15, a CP removal unit 16, a FFT unit 17, and a subcarrier allocation unit 18.

RF unit 15 includes a bandpass filter passing only the signal component of a desired band among signals output from first antenna 10 and second antenna 11, a low-noise amplification circuit amplifying an RF signal, a down converter for down-converting an RF signal, and the like.

CP removal unit 16 removes the CP from the signal output from RF unit 15.

FFT unit 17 converts the signal in the time region output from CP removal unit 16 into a signal in the frequency range by FFT for demodulation of a plurality of subcarriers.

Subcarrier allocation unit 18 extracts each subcarrier output from FFT unit 17 based on, for example, PUSC.

MAC layer processor 14 includes a user data transmission management unit 34, a coding unit 33, a modulation unit 32, a demodulation unit 25, a decoding unit 26, a user data reception management unit 27, and a control unit 41.

User data transmission management unit 34 manages the user data transmitted to a wireless terminal.

Coding unit 33 encodes a downlink signal according to the coding rate of MCS (Modulation and Code Scheme) instructed from a setting unit 46. MCS defines a modulation scheme (QPSK, 16QAM, 64AQAM, etc.) and a coding rate (1/2, 2/3, 3/4).

Modulation unit 32 modulates the coded downlink signal to a wireless terminal according to the MCS modulation scheme instructed from setting unit 46.

Demodulation unit 25 demodulates an uplink signal from the wireless terminal.

Decoding unit 26 decodes the demodulated uplink signal.

User data reception management unit 27 manages the user data received from the wireless terminal.

Control unit 41 includes a communication level table storage unit 42, a communication quality management unit 44, setting unit 46, and a change notification unit 45.

Communication quality management unit 44 periodically receives, from a wireless terminal which is a communication partner, PER (Packet Error Rate) of a signal received at that wireless terminal (i.e., a downlink signal), CINR (Carrier to Interference and Noise Ratio) of the downlink signal, or a notice of information that can replace them. PER indicates the ratio of packets with errors among received packets. CINR is expressed by a value obtained by dividing carrier power by the sum of interference signal power and noise power.

Communication level table storage unit 42 stores a communication level table defining correspondence between a communication level and the range of required CINR at the communication level. In the present specification, the communication level shall be a value determined by the MIMO communication scheme and MCS. At the same PER, throughput increases as the communication level increases. The range of required CINR used is calculated from theoretical values, simulations, measurement results or the like.

FIG. 2 represents an example of a communication level table.

Referring to FIG. 2, the communication level is determined by the DL-MIMO communication scheme and MCS.

For example, at a communication level "1", the DL-MIMO communication scheme is "MATRIX-A", MCS is "QPSK 1/2", and the range of required CINR is less than or equal to x1 [dB].

At a communication level "9", the DL-MIMO communication scheme is "MATRIX-B", MCS is "64QAM 2/3", and the range of required CINR exceeds x8 [dB] and is less than or equal to x9 [dB].

In the present specification, increasing the communication level in value is expressed as "raising (increasing) the communication level", and decreasing the communication level in value is expressed as "lowering (decreasing) the communication level."

(Throughput Characteristics)

Figure 3:
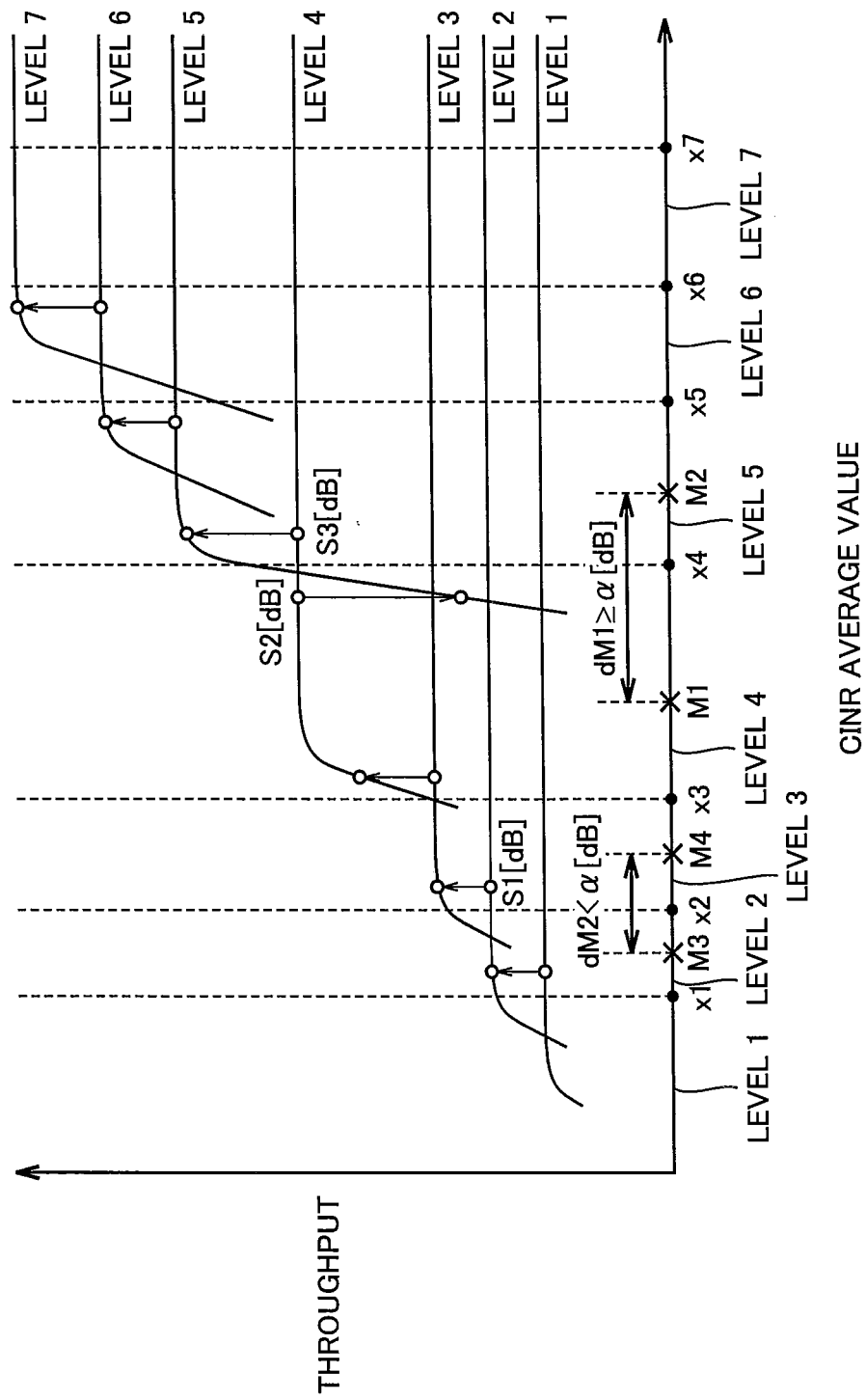
FIG. 3 represents the relation between CINR and throughput at each communication level.

FIG. 3 represents experimental results of the relation between CINR of a downlink signal and throughput of the downlink signal at each communication level. Throughput indicates a value obtained by subtracting a loss caused by error correction, overhead of protocol, and the like from the data transfer amount per unit time that is theoretically achievable (theoretical throughput).

In accordance with the communication level table of FIG. 2, the communication level is changed depending on the value of CINR.

The curve at a communication level n (n=1 to 7) represents the relation between CINR of a downlink signal and throughput of the downlink signal when the DL-MIMO communication scheme and MCS at the communication level n are used.

For example, when the current communication level is "2", that is, when communication is being carried out with the DL-MIMO communication scheme being MATRIX-A and MCS being QPSK 3/4, maximum throughput is obtained when CINR is around S1 [dB], and an error-free state is brought about, in accordance with the experiments as shown in FIG. 3. The error-free state refers to a state with substantially 0% error. In this state, when the communication level is raised by one level, that is, when the DL-MIMO communication scheme is MATRIX-A and MCS is changed to 16QAM 1/2, throughput increases as shown in FIG. 3.

As shown in FIG. 3, in the case where the current communication level is "1", "3", "5"-"6", if the communication level is increased when the error-free state is brought about similarly to the case where the current communication level is "2", throughput also increases.

On the other hand, when the current communication level is "4", that is, when communication is being carried out with the DL-MIMO communication scheme being MATRIX-A and MCS being 16QAM 3/4, maximum throughput is obtained when CINR is around S2 [dB], and the error-free state is brought about. In this state, when the communication level is raised by one level, that is, when MCS is changed to 64QAM 2/3 with the DL-MIMO communication scheme being MATRIX-A, throughput decreases as shown in FIG. 3.

The present embodiment solves such a problem in that throughput decreases. In the present embodiment, attention is focused on a difference dM between a representative value (lower limit, median value or upper limit) of required CINR at the current communication level and a representative value (lower limit, median value or upper limit) of required CINR at a communication level which is one level higher. That is, when this difference dM is small, throughput will not be reduced even if the communication level is increased, as shown in FIG. 3 at S1. On the other hand, when this difference dM is great, the problem in that throughput is reduced arises if the communication level is increased as shown in FIG. 3 at S2.

Setting unit 46 changes the communication level so as to prevent reduction in throughput that occurs in the case where the communication level is "4" as described above, for example.

That is, setting unit 46 lowers the communication level by one level if obtained PER is more than or equal to X %.

If obtained PER is less than or equal to Y % and when difference dM between the representative value (lower limit, median value or upper limit) of required CINR at the current communication level and the representative value (lower limit, median value or upper limit) of required CINR at a communication level which is one level higher is less than α [dB], setting unit 46 raises the communication level by one level.

It should be noted that Y<X holds. X and Y are supposed to be different values in order to create a state where the communication level is maintained. This is because, if X and Y are equal, increase or decrease in communication level will be repeated frequently, resulting in greater processing burden at the transmitting side and the receiving side.

If obtained PER is less than or equal to Y % and when the difference between the representative value of required CINR at the current communication level and the representative value of required CINR at the communication level which is one level higher is more than or equal to α [dB], if obtained CINR belongs to required CINR at the current communication level, setting unit 46 maintains the current communication level.

If obtained PER is less than or equal to Y % and when the difference between the representative value of required CINR at the current communication level and the representative value of required CINR at the communication level which is one level higher is more than or equal to α [dB], if obtained CINR does not belong to the range of required CINR at the current communication level, setting unit 46 selects a communication level at which obtained CINR is included in the range of required CINR and makes a change to the selected communication level.

If obtained PER exceeds Y % and is less than X %, setting unit 46 maintains the current communication level.

Change notification unit 45 outputs a signal that notifies the MIMO communication scheme and MCS of a downlink signal to a wireless terminal for which the communication level has been changed by setting unit 46.

(Operation of Wireless Base Station)

Figure 4:
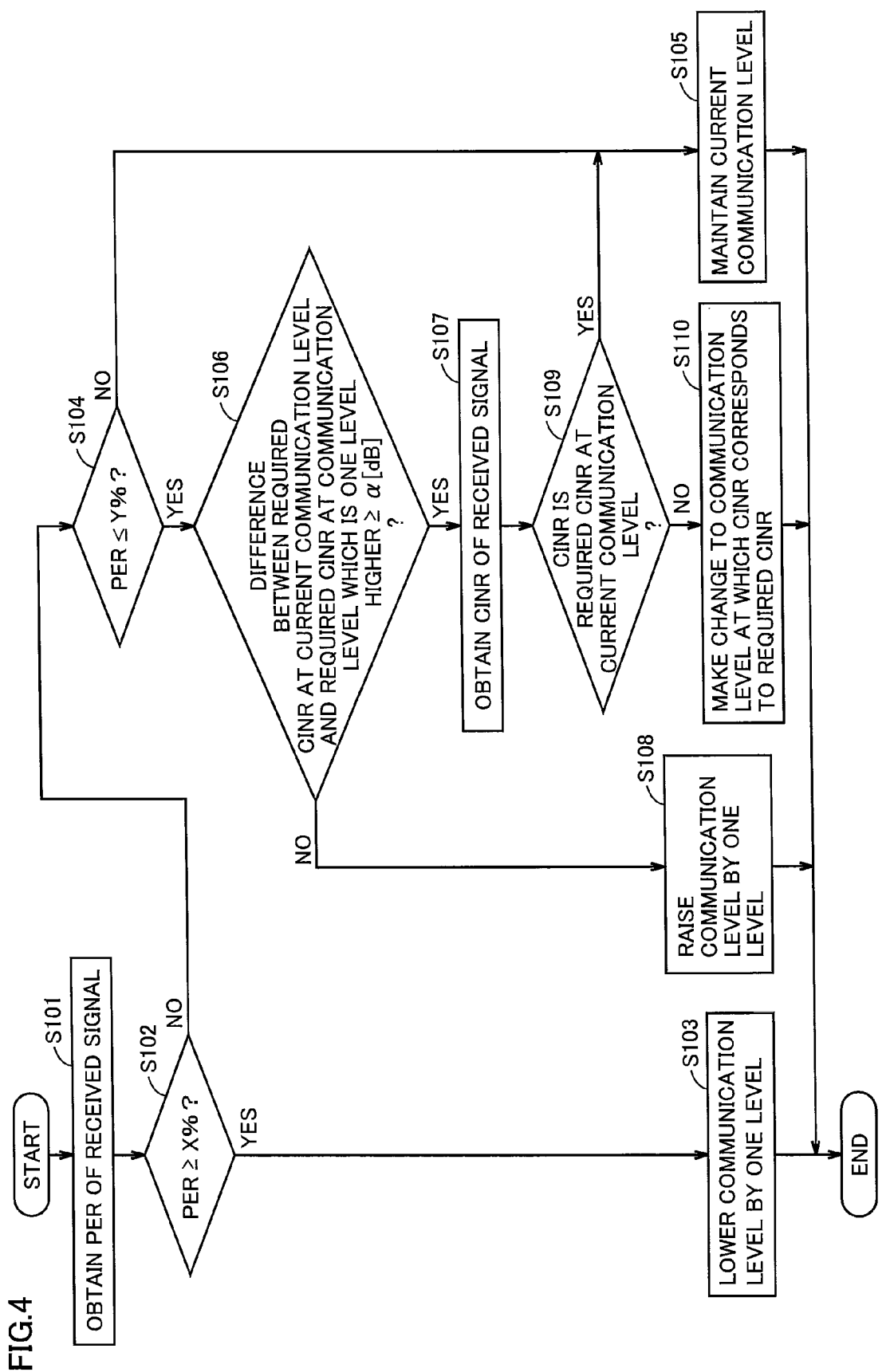
FIG. 4 is a flowchart representing an operation procedure of a wireless base station according to the first embodiment.

FIG. 4 is a flowchart representing an operation procedure of the wireless base station according to the first embodiment.

Referring to FIG. 4, communication quality management unit 44 first obtains, from a wireless terminal, PER of a signal received at the wireless terminal (step S101).

If obtained PER is more than or equal to X % (YES in step S102), setting unit 46 lowers the communication level by one level (step S103).

If obtained PER is less than or equal to Y % (NO in step S102 and YES in step S104), setting unit 46 refers to the communication level table, and when the difference between the representative value of required CINR at the current communication level and the representative value of required CINR at a communication level which is one level higher is less than α [dB] (NO in step S106), setting unit 46 raises the communication level by one level. For example, when the current communication level is "2" as shown in FIG. 3, dM2 which is the difference between a representative value M3 of required CINR at the current communication level and a representative value M4 of required CINR at the communication level "3" which is one level higher is less than α [dB]. Thus, setting unit 46 raises the communication level by one level (step S108).

If obtained PER is less than or equal to Y % (NO in step S102 and YES in step S104), communication quality management unit 44 refers to the communication level table, and when the difference between the representative value of required CINR at the current communication level and the representative value of required CINR at the communication level which is one level higher is more than or equal to α [dB] (YES in step S106), communication quality management unit 44 obtains, from the wireless terminal, CINR of a signal received at the wireless terminal. For example, when the current communication level is "4" as shown in FIG. 3, dM1 which is the difference between a representative value M1 of required CINR at the current communication level and a representative value M2 of required CINR at the communication level "5" which is one level higher is more than or equal to α [dB]. Thus, communication quality management unit 44 obtains, from the wireless terminal, CINR of a signal received at the wireless terminal (step S107).

If obtained CINR belongs to required CINR at the current communication level (YES in step S109), setting unit 46 maintains the current communication level (step S105).

If obtained CINR does not belong to the range of required CINR at the current communication level (NO in step S109), setting unit 46 refers to the communication level table to select a communication level at which obtained CINR is included in the range of required CINR, and makes a change to the selected communication level. For example, when the current communication level is "4" and obtained CINR is S3 [dB] as shown in FIG. 3, and if obtained CINR is included in the CINR range at the communication level "5", the communication level is changed to "5" (step S110).

If obtained PER exceeds Y % and is less than X % (NO in step S102 and NO in step S104), setting unit 46 maintains the current communication level (step S105).

Second Embodiment

In a second embodiment, setting unit 46 prevents reduction in throughput and changes throughput under a scheme different from that of the first embodiment.

That is, if obtained PER is more than or equal to X %, setting unit 46 lowers the communication level by one level.

If obtained PER is less than or equal to Y % and when the difference between the representative value of required CINR at the current communication level and the representative value of required CINR at the communication level which is one level higher is less than α [dB], the problem in that throughput decreases is unlikely to arise even if the communication level is raised as described in the first embodiment. Thus, setting unit 46 raises the communication level by one level.

If obtained PER is less than or equal to Y %, setting unit 46 stores CINR obtained at that time as CINR0. For example, as shown in FIG. 5, suppose that CINR0 is stored at time T1.

When the difference between the representative value of required CINR at the current communication level and the representative value of required CINR at the communication level which is one level higher is more than or equal to α [dB], setting unit 46 obtains CINR at regular intervals, and sets this as CINR1. For example, when the current communication level is "4" as shown in FIG. 5, dM which is the difference between representative value M1 of required CINR at the current communication level and representative value M2 of required CINR at the communication level "5" which is one level higher is more than or equal to α [dB]. Thus, communication quality management unit 44 periodically obtains, from a wireless terminal, CINR of a signal received at the wireless terminal for a predetermined period, and sets obtained CINR as CINR1.

At the time when the difference between CINR1 and CINR0 becomes more than or equal to β [dB], setting unit 46 raises the communication level by one level. For example, as shown in FIG. 5, a difference dC between CINR1 and CINR0 is more than or equal to β [dB] at time T2. Thus, setting unit 46 raises the communication level by one level.

Figure 5:
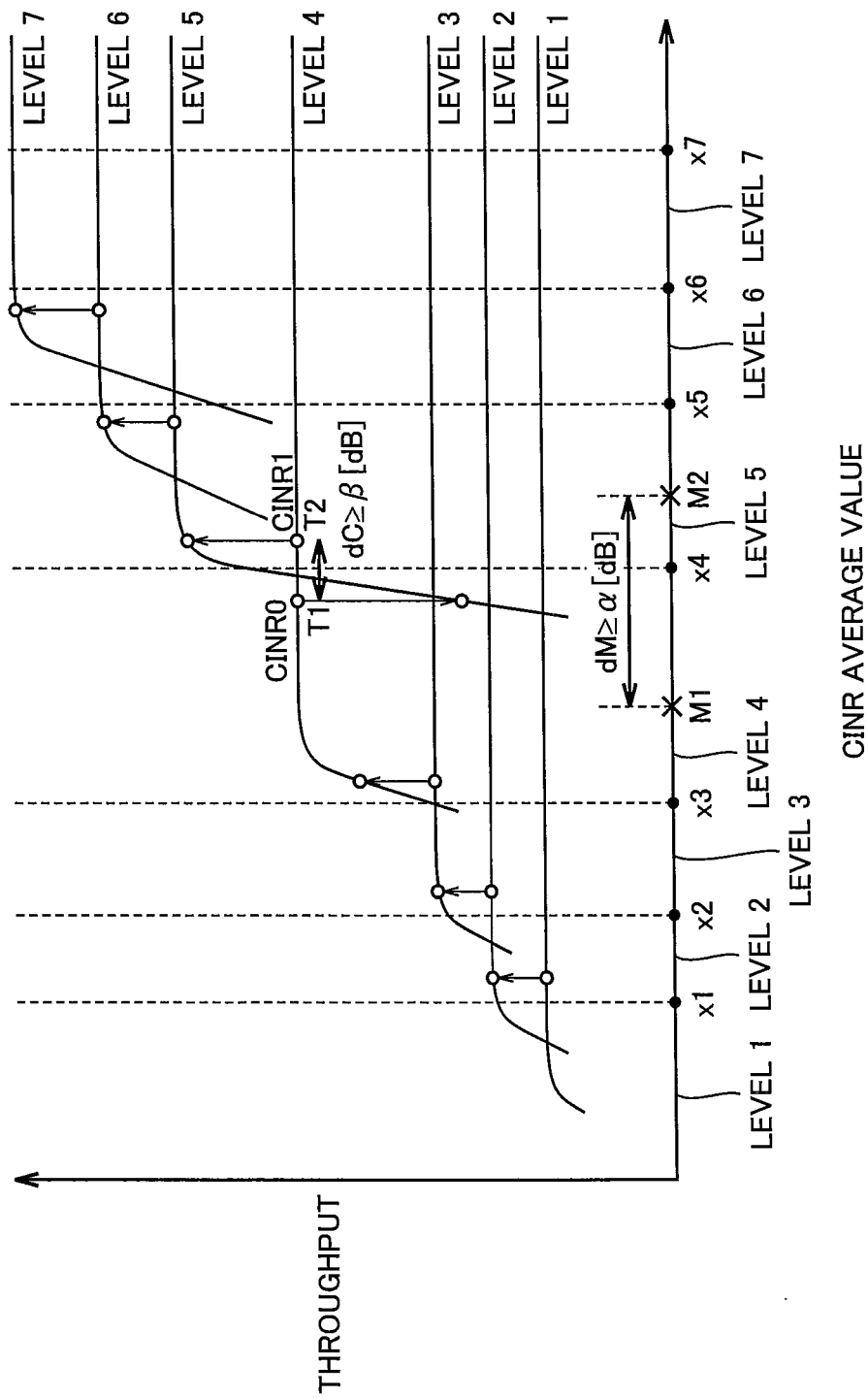
FIG. 5 represents the relation between CINR and throughput at each communication level.

As described, according to the present embodiment, in order to avoid reduction in throughput as shown in FIG. 5 if the communication level is raised at time T1 when obtained PER becomes less than or equal to Y % as in conventional cases, the communication level is raised for the first time at time T2 when the difference between CINR1 and CINR0 becomes more than or equal to β. Throughput can thereby be increased as shown in FIG. 5.

At the time when the difference from CINR0 is less than β [dB], setting unit 46 maintains the current communication level.

If obtained PER exceeds Y % and is less than X %, setting unit 46 maintains the current communication level.

(Operation of Wireless Base Station)

Figure 6:
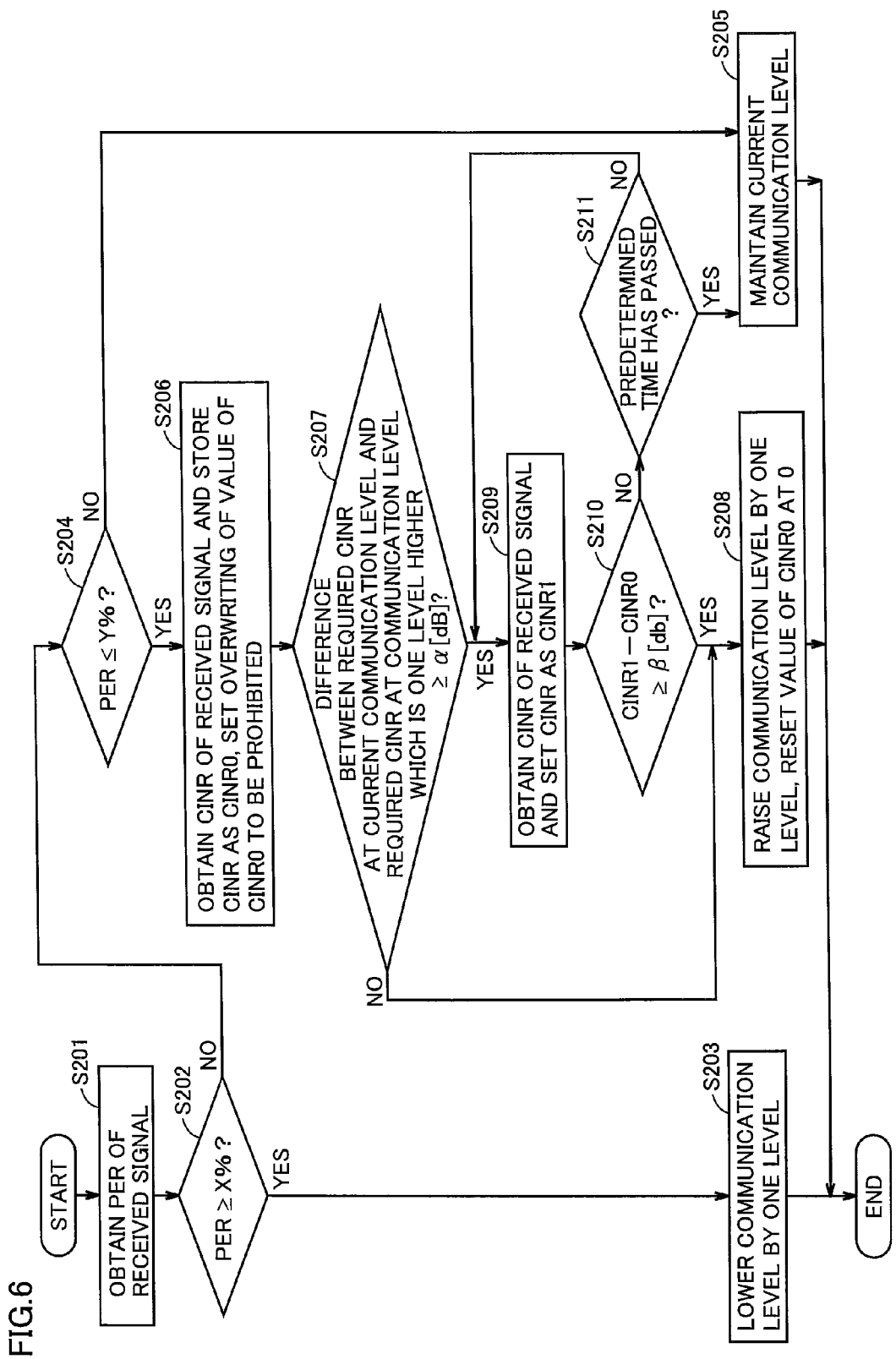
FIG. 6 is a flowchart representing an operation procedure of a wireless base station according to a second embodiment.

FIG. 6 is a flowchart representing an operation procedure of a wireless base station according to the second embodiment.

Referring to FIG. 6, communication quality management unit 44 first obtains, from a wireless terminal, PER of a signal received at the wireless terminal (step S201).

If obtained PER is more than or equal to X % (YES in step S202), setting unit 46 lowers the communication level by one level (step S203).

If obtained PER is less than or equal to Y % (NO in step S202 and YES in step S204), communication quality management unit 44 obtains, from the wireless terminal, CINR of a signal received at the wireless terminal, and stores CINR obtained at that time as CINR0 and sets overwriting of the value of CINR0 to be prohibited (step S206). Furthermore, setting unit 46 refers to the communication level table, and when the difference between the representative value of required CINR at the current communication level and the representative value of required CINR at a communication level which is one level higher is less than α [dB] (NO in step S207), raises the communication level by one level and resets the value of CINR0 at "0" (step S208).

Communication quality management unit 44 refers to the communication level table, and when the difference between the representative value of required CINR at the current communication level and the representative value of required CINR at the communication level which is one level higher is more than or equal to α [dB] (YES in step S207), obtains, from the wireless terminal, CINR of a signal received at the wireless terminal at regular intervals and sets this as CINR1. For example, when the current communication level is "4" as shown in FIG. 5, dM which is the difference between representative value M1 of required CINR at the current communication level and representative value M2 of required CINR at the communication level "5" which is one level higher is more than or equal to α [dB]. Thus, communication quality management unit 44 obtains, from the wireless terminal, CINR of the signal received at the wireless terminal and sets this as CINR1 (step S209).

If the difference between CINR1 and CINR0 is more than or equal to β [dB] (YES in step S210), setting unit 46 raises the communication level by one level, and resets the value of CINR0 at "0." For example, as shown in FIG. 5, if difference dC between CINR1 and CINR0 is more than or equal to β [dB], setting unit 46 raises the communication level by one level (step S208).

If the difference between CINR1 and CINR0 is less than β [dB] (NO in step S210) and when a predetermined time has passed from the processing in step S206 (YES in step S211), setting unit 46 maintains the current communication level (step S205). If the difference between CINR1 and CINR0 is less than β [dB] (NO in step S210) and when the predetermined time has not passed from the processing in step S206 (NO in step S211), setting unit 46 returns the process to step S209.

If obtained PER exceeds Y % and is less than X % (NO in step S202 and NO in step S204), setting unit 46 maintains the current communication level (step S205).

Third Embodiment

Under the WiMAX scheme as described with reference to FIG. 3, when MCS is 16QAM 3/4, if the communication level is raised by one level at the time when maximum throughput is obtained to bring about the error-free state, throughput decreases. The third embodiment uses the changing scheme described in the first embodiment specifically for the case where MCS is 16QAM 3/4.

That is, in the third embodiment, when MCS defined by the current communication level is 16QAM 3/4, setting unit 46 changes the communication level pursuant to a standard similar to that of the first embodiment. When MCS defined by the current communication level is not 16QAM 3/4, setting unit 46 changes the communication level based on PER.

(Operation of Wireless Base Station)

Figure 7:
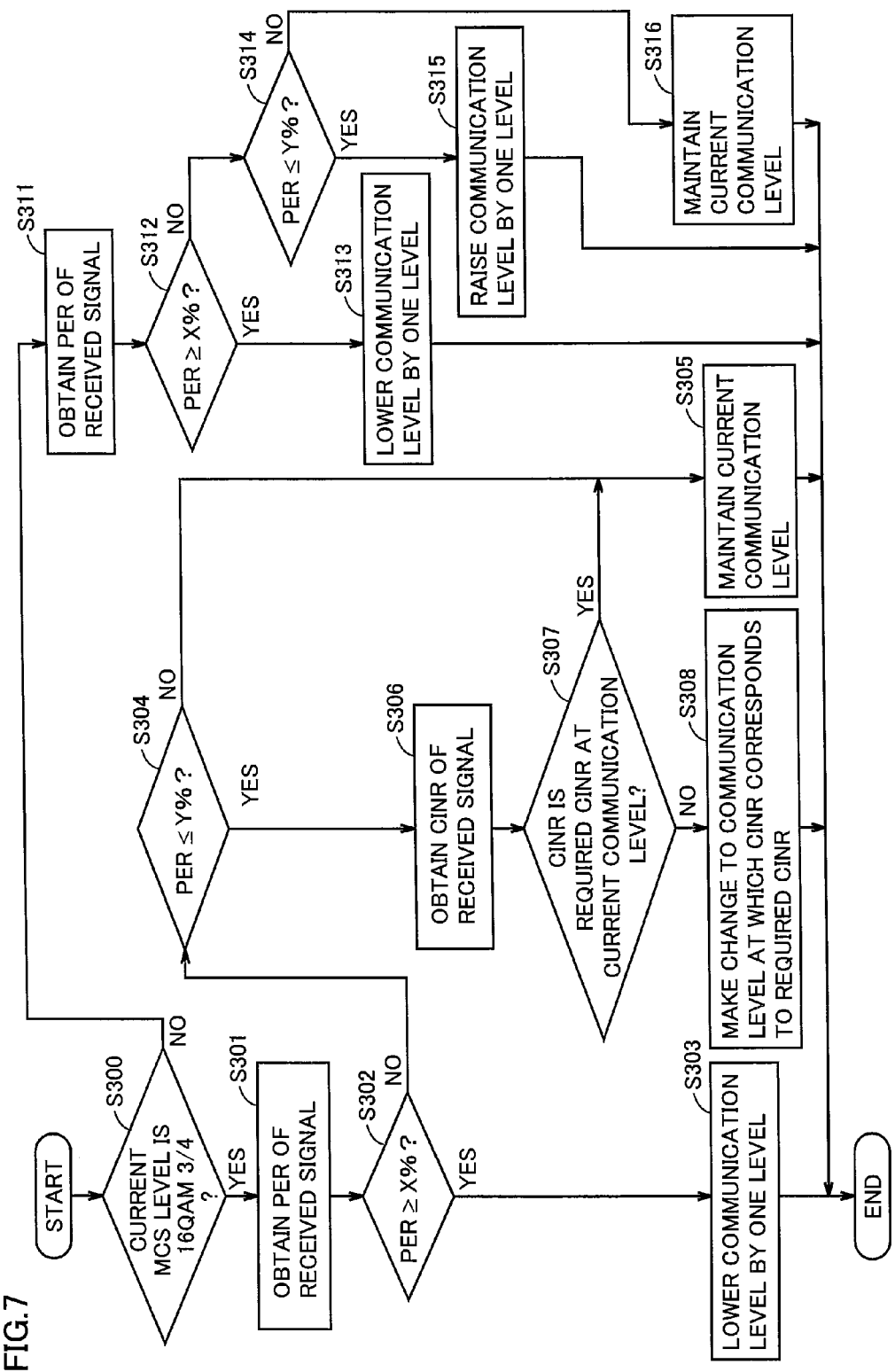
FIG. 7 is a flowchart representing an operation procedure of a wireless base station according to a third embodiment.

FIG. 7 is a flowchart representing an operation procedure of a wireless base station according to the third embodiment.

When MCS defined by the current communication level is 16QAM 3/4 (YES in step S300), processing in steps S301 to S308 is performed.

Communication quality management unit 44 first obtains, from a wireless terminal, PER of a signal received at the wireless terminal (step S301).

If obtained PER is more than or equal to X % (YES in step S302), setting unit 46 lowers the communication level by one level (step S303).

If obtained PER is less than X % and exceeds Y % (NO in step S302 and NO in step S304), setting unit 46 maintains the current communication level (step S305).

If obtained PER is less than X % and less than or equal to Y % (NO in step S302 and YES in step S304), communication quality management unit 44 receives, from the wireless terminal, CINR of the signal received at the wireless terminal (step S306).

Setting unit 46 refers to the communication level table, and if obtained CINR does not belong to the range of required CINR at the current communication level (NO in step S307), selects a communication level at which obtained CINR is included in the range of required CINR referring to the communication level table, and makes a change to the selected communication level (step S308).

If obtained CINR belongs to the range of required CINR at the current communication level (YES in step S307), setting unit 46 maintains the current communication level (step S305).

When MCS defined by the current communication level is not 16QAM 3/4 (NO in step S300), communication quality management unit 44 obtains, from the wireless terminal, PER of the signal received at the wireless terminal (step S311).

If obtained PER is more than or equal to X % (YES in step S312), setting unit 46 lowers the communication level by one level (step S313).

If obtained PER is less than or equal to Y % (NO in step S312 and YES in step S314), setting unit 46 raises the communication level by one level (step S315).

If obtained PER exceeds Y % and is less than X % (NO in step S312 and NO in step S314), setting unit 46 maintains the current communication level (step S316).

Fourth Embodiment

Figure 8:
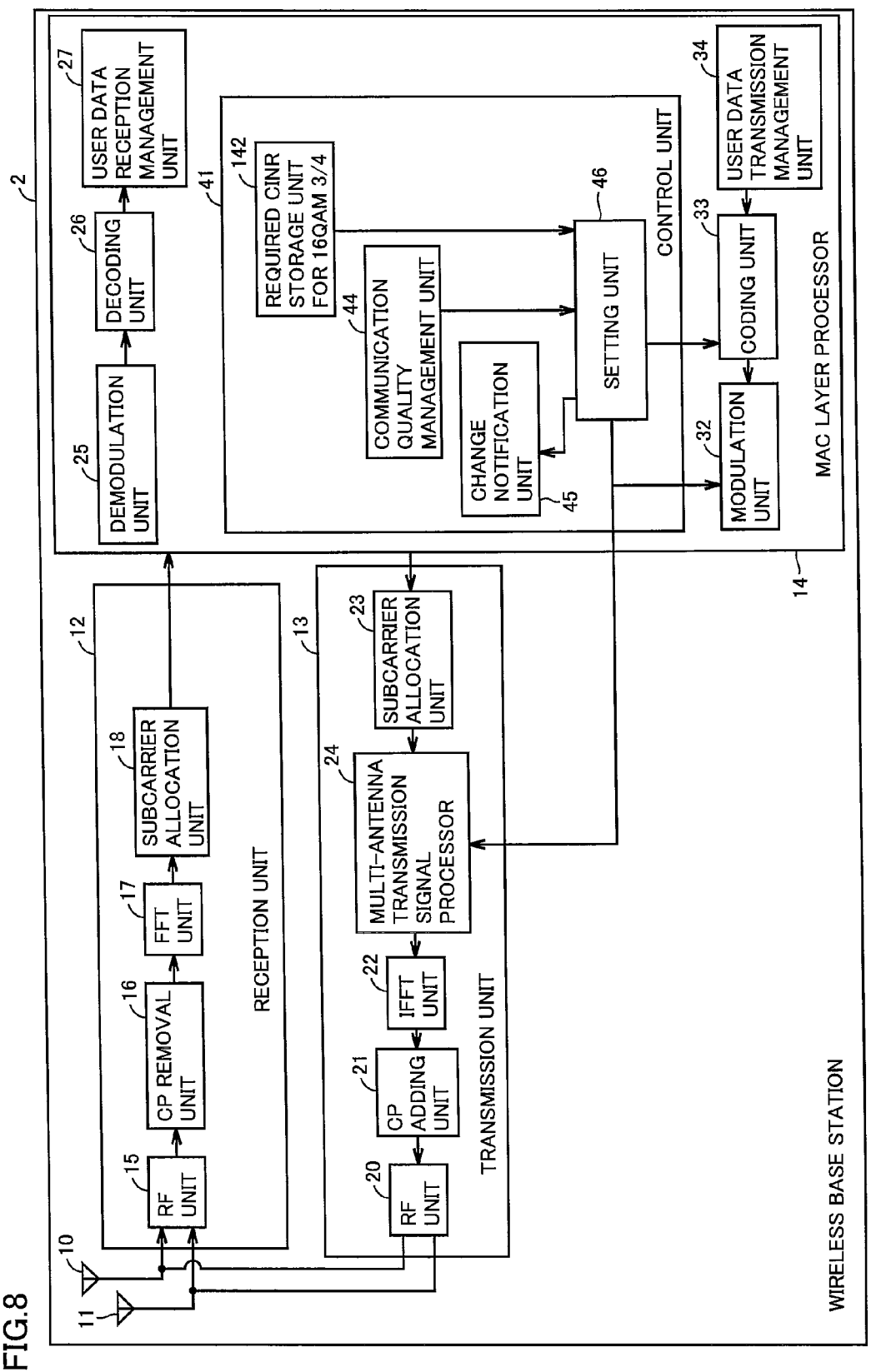
FIG. 8 represents a configuration of a wireless base station according to a fourth embodiment.

FIG. 8 represents a configuration of a wireless base station according to a fourth embodiment of the present invention.

The wireless base station of FIG. 8 includes a required CINR storage unit 142 for 16QAM 3/4 instead of the communication level table storage unit included in the wireless base station of FIG. 1.

Required CINR storage unit 142 for 16QAM 3/4 stores information indicating the range of required CINR in the case where the communication level is 16QAM 3/4.

(Operation of Wireless Base Station)

Figure 9:
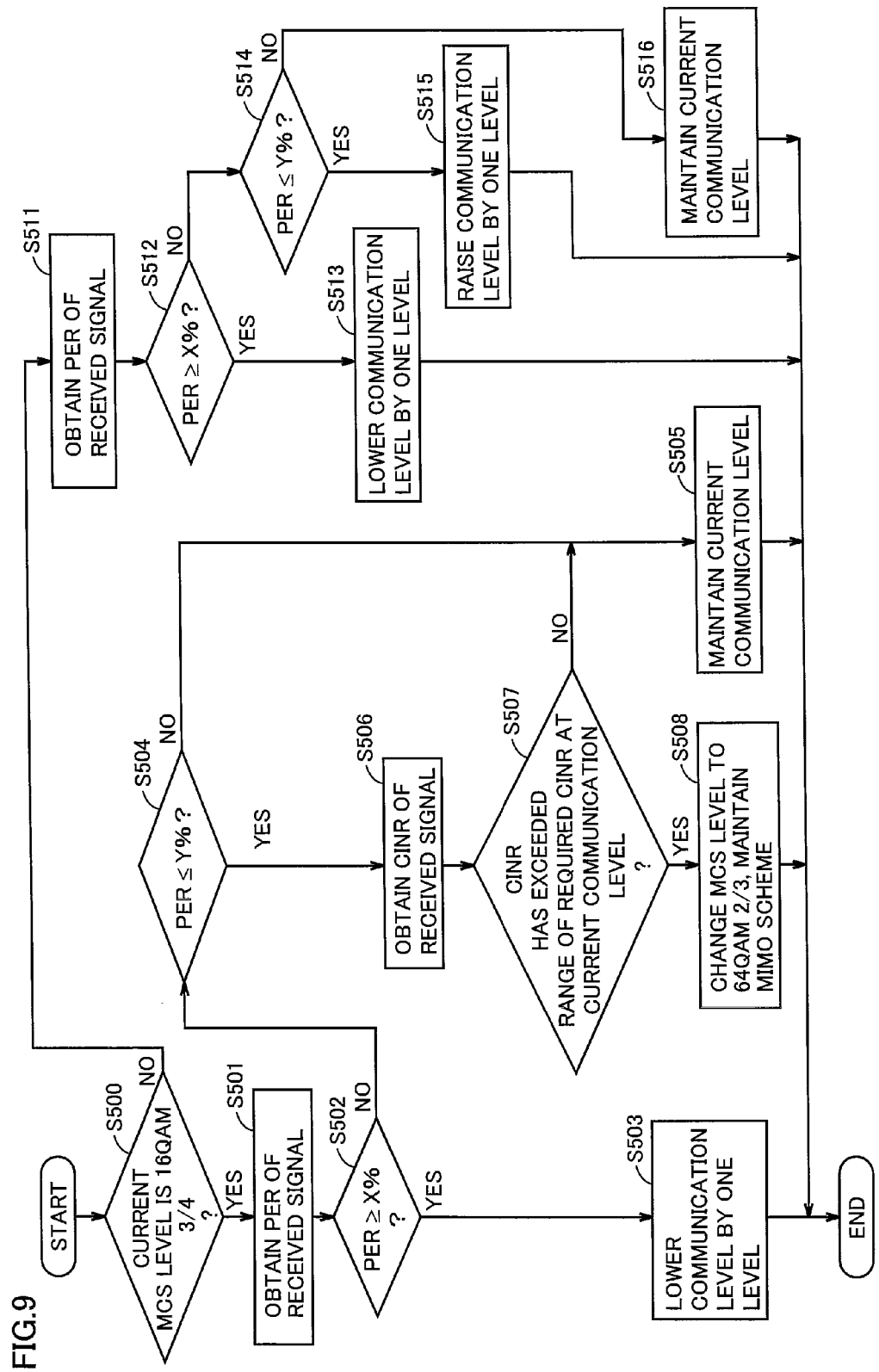
FIG. 9 is a flowchart representing an operation procedure of a wireless base station according to the fourth embodiment.

FIG. 9 is a flowchart representing an operation procedure of the wireless base station according to the fourth embodiment.

When MCS defined by the current communication level is 16QAM 3/4 (YES in step S500), processing in steps S501 to S508 is performed.

Communication quality management unit 44 first obtains, from a wireless terminal, PER of a signal received at the wireless terminal (step S501).

If obtained PER is more than or equal to X % (YES in step S502), setting unit 46 lowers the communication level by one level (step S503).

If obtained PER is less than X % and exceeds Y % (NO in step S502 and NO in step S504), setting unit 46 maintains the current communication level (step S505).

If obtained PER is less than X % and less than or equal to Y % (NO in step S502 and YES in step S504), communication quality management unit 44 obtains, from the wireless terminal, CINR of the signal received at the wireless terminal (step S506).

Setting unit 46 refers to the information in required CINR storage unit 142 for 16QAM 3/4, and if obtained CINR has exceeded the range of required CINR at the current communication level (YES in step S507), changes the MCS level to 64QAM 2/3 and maintains the DL-MIMO communication scheme (step S508).

Setting unit 46 refers to the information in required CINR storage unit 142 for 16QAM 3/4, and if obtained CINR has not exceeded the range of required CINR at the current communication level (NO in step S507), maintains the current communication level (step S505).

When MCS defined by the current communication level is not 16QAM 3/4 (NO in step S500), communication quality management unit 44 obtains, from the wireless terminal, PER of the signal received at the wireless terminal (step S511).

If obtained PER is more than or equal to X % (YES in step S512), setting unit 46 lowers the communication level by one level (step S513).

If obtained PER is less than or equal to Y % (NO in step S512 and YES in step S514), setting unit 46 raises the communication level by one level (step S515).

If obtained PER exceeds Y % and is less than X % (NO in step S512 and NO in step S514), setting unit 46 maintains the current communication level (step S516).

Fifth Embodiment

Under the WiMAX scheme as described with reference to FIG. 3, when MCS is 16QAM 3/4, if the communication level is raised by one level at the time when maximum throughput is obtained to bring about the error-free state, throughput decreases. The fifth embodiment uses the changing scheme described in the second embodiment specifically for the case where MCS is 16QAM 3/4.

That is, in the fifth embodiment, when MCS defined by the current communication level is 16QAM 3/4, setting unit 46 changes the communication level pursuant to a standard similar to that of the second embodiment. When MCS defined by the current communication level is not 16QAM 3/4, setting unit 46 changes the communication level based on PER.

(Operation of Wireless Base Station)

Figure 10:
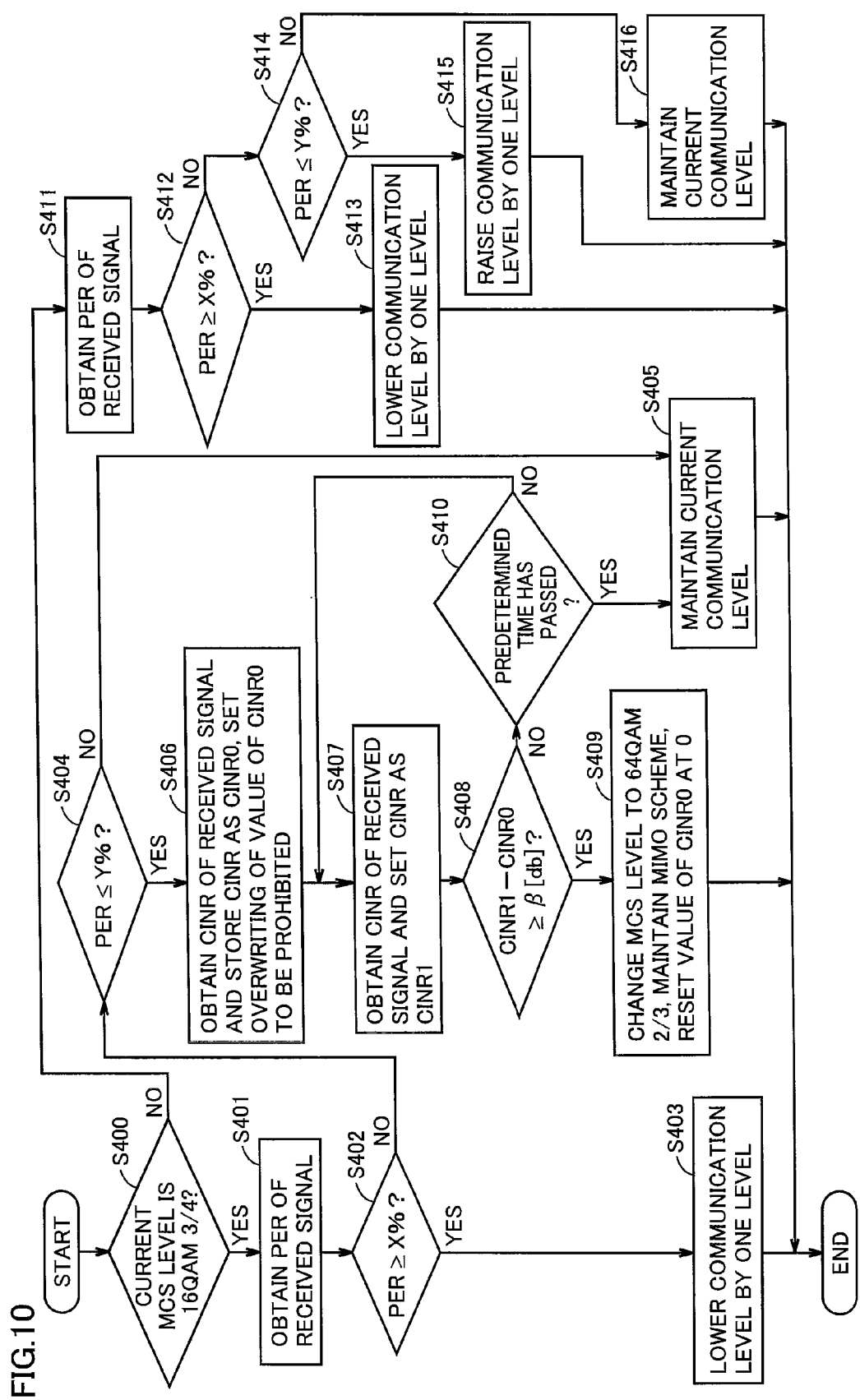
FIG. 10 is a flowchart representing an operation procedure of a wireless base station according to a fifth embodiment.

FIG. 10 is a flowchart representing an operation procedure of a wireless base station according to the fifth embodiment.

When MCS defined by the current communication level is 16QAM 3/4 (YES in step S400), processing in steps S401 to S410 is performed.

Communication quality management unit 44 first obtains, from a wireless terminal, PER of a signal received at the wireless terminal (step S401).

If obtained PER is more than or equal to X % (YES in step S402), setting unit 46 lowers the communication level by one level (step S403).

If obtained PER is less than X % and exceeds Y % (NO in step S402 and NO in step S404), setting unit 46 maintains the current communication level (step S405).

If obtained PER is less than X % and less than or equal to Y % (NO in step S302 and YES in step S404), communication quality management unit 44 obtains, from the wireless terminal, CINR of the signal received at the wireless terminal, and stores CINR obtained at that time as CINR0 and sets overwriting of the value of CINR0 to be prohibited (step S406).

Communication quality management unit 44 obtains, from the wireless terminal, CINR of the signal received at the wireless terminal at regular intervals, and sets this as CINR1 (step S407).

If the difference between CINR1 and CINR0 is more than or equal to 0 [dB] (YES in step S408), setting unit 46 changes the MCS level to 64QAM 2/3, maintains the DL-MIMO communication scheme, and resets the value of CINR0 at "0" (step S409).

If the difference between CINR1 and CINR0 is less than β [dB] (NO in step S408) and if a predetermined time has passed from the processing in step S406 (YES in step S410), setting unit 46 maintains the current communication level (step S405).

If the difference between CINR1 and CINR0 is less than β [dB] (NO in step S408) and if the predetermined time has not passed from the processing in step S406 (NO in step S410), setting unit 46 returns the process to step S407.

When MCS defined by the current communication level is not 16QAM 3/4 (NO in step S400), communication quality management unit 44 obtains, from the wireless terminal, PER of the signal received at the wireless terminal (step S411).

If obtained PER is more than or equal to X % (YES in step S412), setting unit 46 lowers the communication level by one level (step S413).

If obtained PER is less than or equal to Y % (NO in step S412 and YES in step S414), setting unit 46 raises the communication level by one level (step S415).

If obtained PER exceeds Y % and is less than X % (NO in step S412 and NO in step S414), setting unit 46 maintains the current communication level (step S416).

(Modification)

The present invention is not limited to the above-described embodiments, and may include modifications set forth below, for example.

(1) Application to Another Communication System

The scheme for changing the communication level described in the embodiments of the present invention can be applied to another communication system other than WiMAX, such as LTE or XGP.

Figures 11, 12:
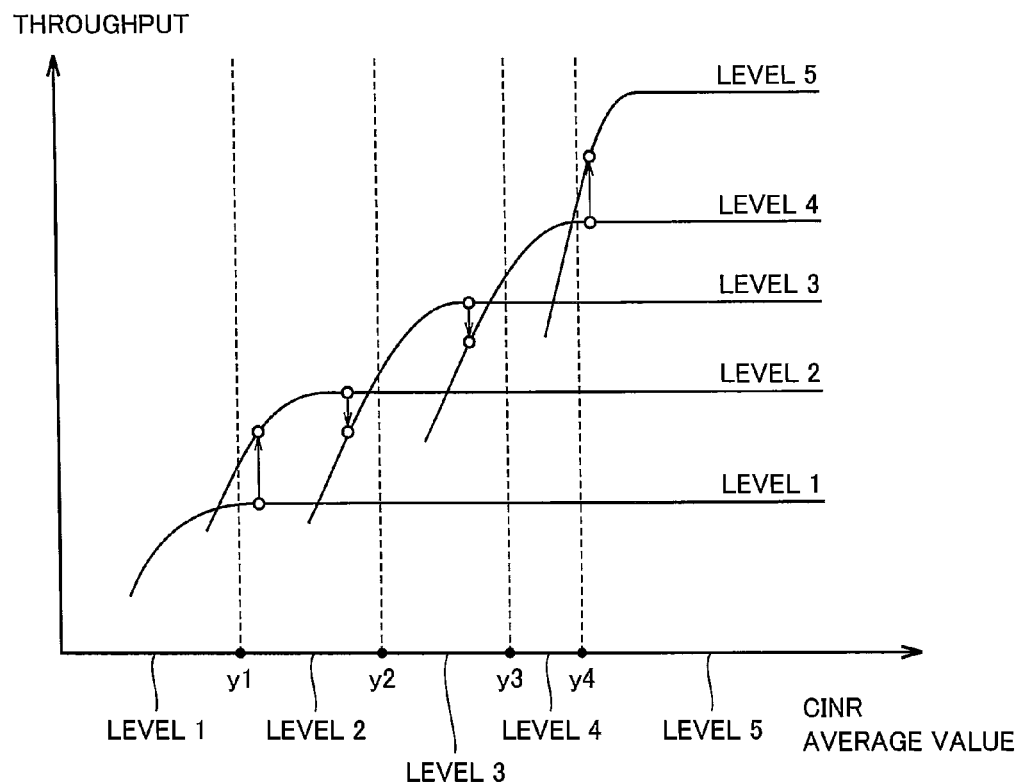
FIG. 11 represents an example of a communication level table in another communication system.
FIG. 12 represents the relation between CINR and throughput at each communication level in the other communication system.

FIG. 11 represents an example of a communication level table in another communication system.

Referring to FIG. 11, the communication level is determined by MCS.

For example, at the communication level "1", MCS is "QPSK 1/2" and the range of required CINR is less than or equal to y1 [dB].

At the communication level "4", MCS is "64QAM 2/3" and the range of required CINR exceeds y3 [dB] and is less than or equal to y4 [dB].

FIG. 12 represents the relation between CINR and throughput at each communication level in the other communication system.

In accordance with the communication level table of FIG. 11, the communication level is changed depending on the value of CINR.

The curve at a communication level n (n=1 to 5) indicates the relation between CINR and throughput when MCS at the communication level n is used.

For example, when the current communication level is "1" and "4", if the communication level is raised by one level at the time when maximum throughput is obtained to bring about the error-free state, throughput increases.

When the current communication level is "2" and "3", if the communication level is raised by one level at the time when maximum throughput is obtained to bring about the error-free state, throughput decreases.

The setting unit changes the communication level so as to prevent reduction in throughput that occurs in the case where the communication level is "2" and "3" as described above, for example. That is, when the communication level is "2" and "3", the setting unit performs processing in steps S301 to S311 of FIG. 7 or processing in steps S401 to S410 of FIG. 10.

(2) Change of Communication Level for Uplink Signal

Although description has been given using the change of the communication level for a downlink signal from a wireless base station as an example, the embodiments of the present invention are not limited to this, but can also be applied to the change of the communication level for an uplink signal from a wireless terminal. Moreover, in either the change of the communication level for an uplink signal or the change of the communication level for a downlink signal, determination on the change can be made by either a wireless terminal or a wireless base station.

(3) Predetermined Value β in Second Embodiment

For predetermined value β described in the embodiments of the present invention, CINR0 which is a value of CINR at the time when the error-free state is brought about may be calculated by experiments. For example, β can be determined as a value more than or equal to the difference between CINR0 and the lower limit of the range of required CINR at a communication level which is one level higher than the current communication level. This value of β can be set at a different value for each communication level, or can be set at the same value for all the communication levels. β may be a mere predetermined value without performing experiments.

It is to be understood that the embodiments disclosed herein are only by way of example, and is not to be taken by way of limitation. The scope of the present invention is not limited by the description above, but not rather by the terms of the appended claims, and is intended to include any modification within the scope and meaning equivalent to the terms of the claims.

REFERENCE SIGNS LIST 2 wireless base station; 10, 11 antenna; 12 reception unit; 13 transmission unit; 14 MAC layer processor; 15, 20 RF unit; 16 CP removal unit; 17 FFT unit; 18, 23 subcarrier allocation unit; 21 CP adding unit; 22 IFFT unit; 24 multi-antenna transmission signal processor; 25 demodulation unit; 26 decoding unit; 27 user data reception management unit; 32 modulation unit; 33 coding unit; 34 user data transmission management unit; 41 control unit; 44 communication quality management unit; 45 change notification unit; 46 setting unit; 142 required CINR storage unit for 16QAM3/4.

The invention claimed is:

1. A communication apparatus comprising:
a storage medium configured to store a plurality of correspondence information, wherein each of the plurality of correspondence information associates a communication level, at least defined by a modulation scheme and a coding rate, with a range of a required carrier to interference and noise ratio (CINR) at said communication level;
a communication quality manage configured to obtain a CINR of a received signal at a communication partner;
a setter configured to set a communication level to be used by
determining a difference between a representative value of a range of a required CINR at a current communication level and a representative value of a range of a required CINR at a communication level which is one level higher than the current communication level, and,
when the determined difference is greater than or equal to a threshold value, determining a communication level that is associated, in the plurality of correspondence information in the storage medium, with a range of a required CINR that includes the obtained CINR of the received signal, and setting the communication level to be used to the determined communication level; and
a transmitter configured to transmit a signal in accordance with said set communication level.

2. The communication apparatus according to claim 1, wherein said communication quality manager further obtains an error rate of said received signal, and wherein said setter is configured to set the communication level when said obtained error rate is less than or equal to a predetermined error rate.

3. The communication apparatus according to claim 2, wherein setting the communication level to be used further comprises, when the determined difference is less than said threshold value, setting the communication level to be used to the communication level which is one level higher than the current communication level.

4. The communication apparatus according to claim 1, wherein each communication level is defined by a modulation scheme and a coding rate, wherein said setter sets the modulation scheme and the coding rate, and wherein said transmitter subjects a signal to modulation and coding for transmission, in accordance with the set modulation scheme and the coding rate.

5. The communication apparatus according to claim 1, further comprising a plurality of antennas, wherein said transmitter transmits a signal through the plurality of antennas.

6. The communication apparatus according to claim 5, wherein said communication level is defined by a modulation scheme, a coding rate, and a MIMO scheme, wherein said setter sets the modulation scheme, the coding rate, and the MIMO scheme, and wherein said transmitter subjects data streams to modulation and coding, and when said set MIMO scheme is said time-space coding scheme, subjects one data stream, having been subjected to said modulation and coding, to time-space coding for output to said plurality of antennas, and when said set MIMO scheme is said spatial multiplexing scheme, subjects a plurality of data streams, having been subjected to said modulation and coding, to spatial multiplexing for output to said plurality of antennas.

7. A communication apparatus comprising:
 a storage medium configured to store a plurality of correspondence information, wherein each of the plurality of correspondence information associates a communication level, at least defined by a modulation scheme and a coding rate, with a range of a required carrier to interference and noise ratio (CINR) at said communication level;
 a communication quality manager configured to obtain a CINR and an error rate of a received signal at a communication partner;
 a setter configured to set a communication level to be used by
  determining whether said obtained error rate is less than or equal to a predetermined error rate, and,
  when said obtained error rate is less than or equal to said predetermined error rate at a first time,
   determining a first difference between a representative value of a range of a required CINR at a current communication level and a representative value of a range of a required CINR at a communication level which is one level higher than the current communication level,
   when the first difference is greater than or equal to a threshold value, periodically determining a second difference between a current value of the CINR of the received signal and a value of the CINR of the received signal at the first time, and, when the second difference is greater than or equal to a predetermined value, setting the communication level to be used to the communication level which is one level higher than the current communication level; and
 a transmitter configured to transmit a signal in accordance with said set communication level.

8. The communication apparatus according to claim 7, wherein setting the communication level to be used further comprises, when the first difference is less than said threshold value, setting the communication level to be used to the communication level which is one level higher than the current communication level.

9. The communication apparatus according to claim 7, wherein each communication level is defined by a modulation scheme and a coding rate, wherein said setter sets the modulation scheme and the coding rate, and wherein said transmitter subjects a signal to modulation and coding for transmission, in accordance with the set modulation scheme and the coding rate.

10. The communication apparatus according to claim 7, further comprising a plurality of antennas, wherein said transmitter transmits a signal through the plurality of antennas.

11. The communication apparatus according to claim 10, wherein said communication level is defined by a modulation scheme, a coding rate, and a MIMO scheme, wherein said setter sets the modulation scheme, the coding rate, and the MIMO scheme, and wherein said transmitter subjects data streams to modulation and coding, and when said set MIMO scheme is time-space coding scheme, subjects one data stream, having been subjected to said modulation and coding, to time-space coding for output to said plurality of antennas, and when said set MIMO scheme is spatial multiplexing scheme, subjects a plurality of data streams, having been subjected to said modulation and coding, to spatial multiplexing for output to said plurality of antennas.

12. A communication method in a communication apparatus including a storage unit configured to store a plurality of correspondence information, wherein each of the plurality of correspondence information associates a communication level, at least defined by a modulation scheme and a coding rate, with a range of a required carrier to interference and noise ratio (CINR) at said communication level, the method comprising:
 obtaining a CINR of a received signal at a communication partner;
 determining a difference between a representative value of a range of a required CINR at a current communication level and a representative value of a range of a required CINR at a communication level which is one level higher than the current communication level, and,
 when the determined difference is greater than or equal to a threshold value, determining a communication level that is associated, in the plurality of correspondence information in the storage unit, with a range of a required CINR that includes the obtained CINR of the received signal, and setting the communication level to the determined communication level; and
 transmitting a signal in accordance with said set communication level.

* * * * *